(No Model.)
E. F. RYDER.
HUB PROTECTOR.
No. 492,436.
Patented Feb. 28, 1893.
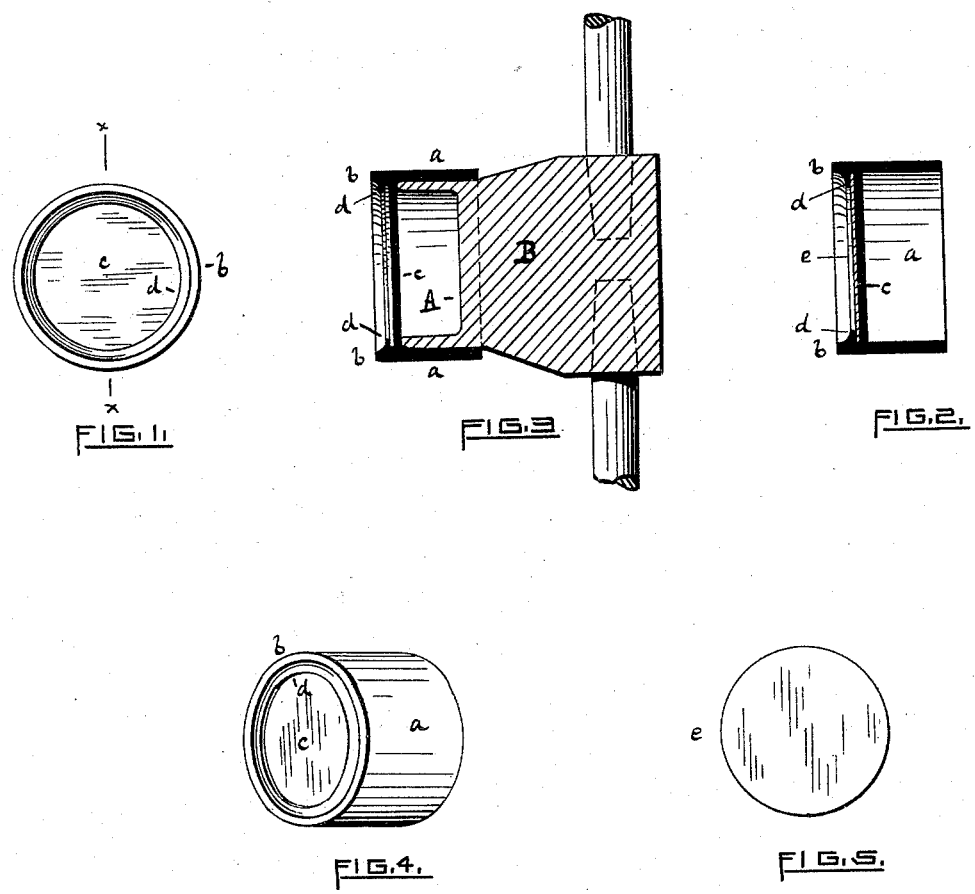
WITNESSES.
INVENTOR.
Edgar F. Ryder

UNITED STATES PATENT OFFICE.

EDGAR F. RYDER, OF PROVIDENCE, RHODE ISLAND, ASSIGNOR TO THE ATLANTIC MANUFACTURING COMPANY, OF SAME PLACE.

HUB-PROTECTOR.

SPECIFICATION forming part of Letters Patent No. 492,436, dated February 28, 1893.

Application filed April 21, 1892. Serial No. 430,074. (No model.)

*To all whom it may concern:*

Be it known that I, EDGAR F. RYDER, of the city and county of Providence, in the State of Rhode Island, have invented a certain new and useful Improvement in Hub-Protectors; and I declare the following to be a specification thereof, reference being had to the accompanying drawings.

Like letters indicate like parts.

Figure 1. is a front elevation of my invention. Fig. 2. is a view of the same as seen on line x x of Fig. 1. Fig. 3. is a view of the same as seen on line x x of Fig. 1. but is shown in position upon a hub, the latter being represented in diametrical vertical section. Fig. 4. is a perspective view of my improved hub protector. Fig. 5. is a plan view of the metallic disk, which may be used in connection with my invention for the purpose of ornament.

My invention is designed for use upon the hubs of carriage wheels and consists of an elastic tubular cover, having one end closed and the other open, the latter being adapted to fit upon the outer flange of the hub, as hereinafter fully specified.

My hub protector is made preferably of india rubber and consists of a tubular portion $a$, a flange $b$ and a closed end $c$, all in one piece. On the inner surface of the flange $b$, I may put a concentric lip $d$, and, if desired, a metallic disk $e$, properly ornamented or polished, may be secured by inserting it between the end $c$, and lip $d$, as seen in Fig. 2, thus giving a richer and more pleasing appearance.

The diameter of the tubular portion of my device should be such as to enable it to snugly receive the metallic flange A, of the hub B, and when the device is pressed into position, as shown in Fig. 3, and the air suction thus caused, together with the frictional engagement of the rubber surface on the metallic flange, will hold the protector firmly on the hub, so that it cannot easily be removed therefrom. It is for the sake of securing this suction that I require the use of an elastic substance and I prefer india rubber, because it is impervious to air and is well adapted to furnish a frictional engagement with the hub flange when stretched upon and over it.

My said invention has several important uses. It covers the end of the hub completely, so as to prevent the exposure of the gudgeon grease from the axle and axle boxes of the wheel and the consequent danger of spoiling or defacing garments thereby. It is of great service in protecting the hub and hub flange from the injury or defacement which is often caused by the collision of the wheels of carriages with each other, not only in the streets, but especially in stables or other places where carriages are stored away in close proximity with each other. Hubs which are covered with my elastic protector can neither receive injury from sudden or violent contact with other objects nor mar or deface other things which they may accidentally strike against.

It is a common practice to use the flange of a wheel as a step in entering or leaving a carriage. This use of a hub will scratch and injure it, but when my improved hub protector is used, not only is the hub saved from this harm, but the rubber covering furnishes a safe and sufficient foothold for that purpose.

I claim as a novel and useful invention and desire to secure by Letters Patent—

1. The combination of the elastic tube $a$, and the closed end $c$, adapted to be held by air-suction upon the hub of a wheel, substantially as specified.

2. The combination of the tubular portion $a$, the closed end $c$, the flange $b$ and the lip $d$, all made of an elastic material in one piece, and the metallic disk $e$, substantially as and for the purpose specified.

EDGAR F. RYDER.

Witnesses:
 EDWARD BUFFUM,
 DANIEL W. FINK.